(12) United States Patent
Wang et al.

(10) Patent No.: US 12,146,046 B2
(45) Date of Patent: Nov. 19, 2024

(54) POLYPROPYLENE COMPOSITION WITH IMPROVED OPTICAL PROPERTIES AND WHITENING RESISTANCE

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI)

(73) Assignee: Borealis AG, Vienna (AT)

( * ) Notice: Subject to any disclaimer, the term of this patent is extended or adjusted under 35 U.S.C. 154(b) by 720 days.

(21) Appl. No.: 17/291,715

(22) PCT Filed: Oct. 29, 2019

(86) PCT No.: PCT/EP2019/079491
§ 371 (c)(1),
(2) Date: May 6, 2021

(87) PCT Pub. No.: WO2020/104145
PCT Pub. Date: May 28, 2020

(65) Prior Publication Data
US 2022/0017733 A1    Jan. 20, 2022

(30) Foreign Application Priority Data
Nov. 23, 2018  (EP) ..................... 18207994

(51) Int. Cl.
*C08L 23/12* (2006.01)
*C08J 5/18* (2006.01)

(52) U.S. Cl.
CPC ............ *C08L 23/12* (2013.01); *C08J 5/18* (2013.01); *C08J 2323/12* (2013.01); *C08J 2323/14* (2013.01); *C08L 2203/16* (2013.01); *C08L 2203/30* (2013.01); *C08L 2205/025* (2013.01); *C08L 2205/03* (2013.01)

(58) Field of Classification Search
CPC .. C08L 23/12; C08L 2205/025; C08L 23/142; C08L 23/14; C08J 2323/12; C08J 2323/14; C08J 2423/14
See application file for complete search history.

(56) References Cited

U.S. PATENT DOCUMENTS

| | | | | |
|---|---|---|---|---|
| 5,623,021 | A * | 4/1997 | Pelliconi ........... | B32B 27/08 525/240 |
| 2010/0021666 | A1* | 1/2010 | De Palo .............. | C08L 23/10 525/240 |
| 2010/0201016 | A1* | 8/2010 | Kawamura ........... | C08L 53/00 264/54 |
| 2010/0249329 | A1* | 9/2010 | Grein ................. | C08J 5/18 525/240 |
| 2012/0046417 | A1* | 2/2012 | Massari .............. | C08L 23/142 525/240 |
| 2015/0051346 | A1* | 2/2015 | Reichelt ............. | C08F 210/06 525/53 |
| 2019/0330459 | A1* | 10/2019 | Wang ................. | C08F 210/16 |

FOREIGN PATENT DOCUMENTS

| | | | |
|---|---|---|---|
| CN | 107787347 | A | 3/2018 |
| EP | 0129368 | A1 | 12/1984 |
| EP | 0170255 | A1 | 2/1986 |
| EP | 260130 | A1 | 3/1988 |
| EP | 423101 | A2 | 4/1991 |
| EP | 537130 | A1 | 4/1993 |
| EP | 0887379 | A1 | 12/1998 |
| EP | 1702956 | A2 | 9/2006 |
| EP | 1828304 | A1 | 9/2007 |
| EP | 2586824 | A1 | 5/2013 |
| EP | 3064548 | * | 9/2016 |
| EP | 3064548 | A1 | 9/2016 |
| WO | 9212182 | A1 | 7/1992 |
| WO | 9728170 | A1 | 8/1997 |
| WO | 9846616 | A1 | 10/1998 |
| WO | 9849208 | A1 | 11/1998 |
| WO | 9856831 | A1 | 12/1998 |
| WO | 9858976 | A1 | 12/1998 |
| WO | 9912981 | A1 | 3/1999 |
| WO | 9919335 | A1 | 4/1999 |
| WO | 0034341 | A2 | 6/2000 |
| WO | 2012093099 | A1 | 7/2012 |
| WO | 2013007650 | A1 | 1/2013 |
| WO | 2015011135 | A1 | 1/2015 |

OTHER PUBLICATIONS

Klimke, et al., "Optimisation and Application of Polyolefin Branch Quantification by Melt-State 13C NMR Spectroscopy," Macromolecular Chemistry and Physics, vol. 207, 2006, pp. 382-395.
Parkinson, et al., "Effect of Branch Length on 13C NMR Relaxation Properties in Moten Poly[ethylene-co-(x-olefin)] Model Systems," Macromolecular Chemistry and Physics, vol. 208, 2007, pp. 2128-2133.
Castignolles, et al., "Detection and Quantification of Branching in Polyacrylates by Size-Chromatography (SEC) and Melt-State 13c NMR Spectroscopy," Polymer 50, 2009, pp. 2373-2383.
Pollard, et al., "Observation of Chain Branching in Polyethylene in the Solid State and Melt via 13C NMR Spectroscopy and Melt NMR Relaxation Time Measurements," Macromolecules, vol. 37, 2004, pp. 813-825.
Filip, et al., "Heteronuclear decoupling under fast MAS by a rotor-synchronized Hahn-echo pulse train," Journal of Magnetic Resonance, vol. 176, 2005, pp. 239-243.
Griffin, et al., "Low-load Rotor-Synchronised Hahn-echo Pulso Train (RS-HEPT) 1H Decoupling in Solid-State NMR: factors affecting MAS Spin-echo Dephasing Times",. Magnetic Resonance in Chemistry, 2007; 45: S198-S208, Published online in Wiley Interscience.

(Continued)

*Primary Examiner* — Mark S Kaucher
(74) *Attorney, Agent, or Firm* — Lowenstein Sandler LLP (57) ABSTRACT

The invention is related to polypropylene compositions combining high impact strength with good haze and additionally showing good stress whitening resistance.

17 Claims, 1 Drawing Sheet

(56) References Cited

OTHER PUBLICATIONS

Wang, et al., "Structural Analysis of Ethylene/Propylene Copolymers Synthesized with a Constrained Geometry Catalyst," Macromolecules, 2000, vol. 33, pp. 1157-1162.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Busico, et al., "Microstructure of polypropylene," Progress in Polymer Science, vol. 26, 2001, pp. 443-533.
Cheng, H.N., "C NMR Analysis of Ethylene-Propylene Rubbers," Macromolecules, 1984, vol. 17, 1984, pp. 1950-1955.
International Search Report and written opinion for PCT/EP2019/079491 mailed Jan. 9, 2020, 13 pages.
Resconi, et al., "Selectivity in Propene Polymerization with Metallocene Catalysts," Chem. Rev., 2000, vol. 100, pp. 1253-1345.

\* cited by examiner

Figure 1: schematic representation of experimental set up for stress whitening measurement Figure 2: schematic diagram of the function recorded during stress whitening experiment

POLYPROPYLENE COMPOSITION WITH IMPROVED OPTICAL PROPERTIES AND WHITENING RESISTANCE

CROSS-REFERENCE TO RELATED APPLICATIONS

This application is a national phase entry under 35 U.S.C. § 371 of International Application No. PCT/EP2019/079491, filed on Oct. 29, 2019, which claims the benefit of priority of European Patent Application No. 18207994.7, filed on Nov. 23, 2018. The contents of these applications are hereby incorporated by reference herein in their entirety.

FIELD OF THE INVENTION

The present invention relates to polypropylene compositions having good balance of impact properties and optical properties with good whitening resistance characteristics. Polypropylenes are widely used in a lot of application areas, like moulding, tubing, pipe, lids, etc. due to their good combination of cost, performance and processability. At the same time, there is a continuous search for tailored polymers which meet the requirements of these applications. The demands can be challenging, since many polymer properties are directly or indirectly interrelated, i.e. improving a specific property can only be accomplished on the expense of another property.

For example, polypropylene films are quite often used in the packaging industry for consumer related articles with good "see-through" properties on the content of the packed goods. There is an also increasing trend in the medical packaging industry to use such polypropylene films. In these technical areas optical properties, especially low haze is always required.

Nowadays, due to the higher life standards and more strict requirements, specific properties like a good combination of stiffness, toughness and transparency, in the sense of low haze, become continuously more important.

It is further important, that the polymers provide good optical properties in the sense of low haze and good transparency despite having undergone mechanical deformation. I.e. there is a strong requirement for polypropylene having a low tendency to stress whitening. Such stress whitening marks are disturbing the optical performance and impression of injection moulded final articles strongly and should therefore be avoided.

It is known that stress whitening can be compensated by adding a high density polyethylene (HDPE) component in polypropylene system. However, such approaches are also known to reduce transparency or increase haze respectively.

EP 2586824 describes a polymer composition comprising (A) a polypropylene copolymer having below 4.0 wt % comonomer being C5 to C12 α-olefins, and (B) a propylene copolymer having a comonomer content of 4.0 to 20.0 wt %, the comonomers being C5 to C12 α-olefins, and (C) a low-crystalline polymer having a melting temperature of below 120° C., wherein further (i) the weight ratio of the polypropylene (A) to the propylene copolymer (B) is in the range of 20/80 to 80/20, and (ii) preferably the polymer composite comprises 5 to 50 wt % based on the total amount of polymer composite of low-crystalline polymer (C). The drawback of C3 rich rubber as modifier is that the optical behaviour can only be accomplished on the expense of impact strength in low temperature.

EP 1828304 claims a PP composition comprising (a) 50-77 wt % of a crystalline propylene polymer having an amount of isotactic pentads (mmmm), measured by 13C-NMR on the XCI fraction, higher than 97.5 mol % and a polydispersity index ranging from 4 to 10; (b) 13-28 wt % of an elastomeric copolymer of ethylene and propylene having a C2 content from 30 to 70 wt % and exhibiting an XCI fraction of less than 45 wt %, the XCS fraction having an intrinsic viscosity value ranging from 2 to 4 dl/g; and (c) 10-22 wt % of PE homopolymer or ethylene-propylene copolymer having a comonomer content lower than 10 wt % and an intrinsic viscosity value ranging from 1 to 3 dl/g; in said composition component (b) plus component (c) being in amount of at least 25 wt %. In this patent HDPE is used as modifier to reduce stress whitening in a polypropylene HECO material, resulting in the aforementioned disadvantages.

EP 1702956 claims polyolefin compositions with good impact strength and transparency comprising (a) 85-98 wt % based on the total weight of the composition of a heterophasic propylene/α-olefin copolymer comprising a polymer or copolymer of propylene and an α-olefin with 0-15 mol % of the α-olefin as matrix polymer and a propylene/α-olefin rubber copolymer comprising 20-80 mol % of the α-olefin and (b) 15-2 wt % based on the total weight of the composition of an ethylene homopolymer, the ethylene homopolymer having a density lower than 0,920 g/cm$^3$ according to ISO1183. In this patent LDPE is used as modifier to reduce stress whitening in polypropylene, thus limiting the stiffness of the resulting composition.

Accordingly, it is an object of the invention to provide propylene compositions for packaging applications with improved impact strength at ambient and low temperatures, and good optical properties, especially a low tendency to stress whitening after deformation.

The present invention is based on the finding that the above object can be achieved by introducing a specific polypropylene copolymer as modifier into polypropylene homopolymer. Surprisingly it has been found that such polymer composition provides both good impact behaviour and good optical properties, especially good resistance to stress whitening, without much negatively effect on the stiffness of the material.

Accordingly, the present invention is directed to a polypropylene composition comprising
a) a propylene homopolymer (H-PP) and
b) a propylene copolymer (C-PP) of propylene and 1-hexene,
wherein
i. the propylene copolymer (C-PP) has an overall 1-hexene content in the range of 3.8 to 10.0 wt.-%,
ii. the propylene copolymer (C-PP) has a xylene soluble content (XCS) in the range of 8.0 to 30.0 wt.-%, and
iii. the weight ratio [(C-PP)/(H-PP)] of the propylene copolymer (C-PP) to the propylene homopolymer (H-PP) is in the range of 10/90 to 45/55.

In further embodiments, the invention is also related to articles comprising said polymer composition, preferably to films and/or injection moulded articles comprising said composition.

DETAILED DESCRIPTION OF THE INVENTION

In the following the individual components are defined in more detail.

Preferably the polypropylene composition comprises the propylene homopolymer (H-PP) and the propylene copolymer (C-PP) as the only polymer components. Further it is appreciated that the propylene copolymer (C-PP) comprises the propylene copolymer faction (A) and the propylene copolymer fraction (B) as the only polymer components.

As stated above it is preferred that the propylene homopolymer (H-PP) and propylene copolymer (C-PP) are the only polymer components of the polypropylene composition. Accordingly the amount of the propylene homopolymer (H-PP) and propylene copolymer (C-PP) together within the polypropylene composition is at least 80 wt.-%, more preferably at least 90 wt.-%, yet more preferably at least 95 wt.-%, like at least 98 wt.-%. The remaining part are typical additives, like antioxidants, nucleating agents, slip agents and/or antistatic agents.

Further it is essential that the propylene homopolymer (H-PP) and propylene copolymer (C-PP) are present in the polypropylene composition of the instant invention in a specific weight ratio. Accordingly the weight ratio [(C-PP)/(H-PP)] of the propylene copolymer (C-PP) to the propylene homopolymer (H-PP) is in the range of 10/90 to 45/55, preferably in the range of 10/90 to 40/60, more preferably in the range of 10/90 to 35/65.

Further, it is preferred that the polypropylene composition of the present invention has a melt flow rate (MFR) given in a specific range. The melt flow rate measured under a load of 2.16 kg at 230° C. (ISO 1133) is denoted as $MFR_2$ (230° C.). Accordingly, it is preferred that in the present invention the polypropylene composition has a melt flow rate $MFR_2$ (230° C.) measured according to ISO 1133 in the range of 1.5 to 100.0 g/10 min, more preferably in the range of 2.0 to 80.0 g/10 min, still more preferably in the range of 3.0 to 60.0 g/10 min.

Additionally the propylene copolymer can be defined by the xylene cold soluble (XCS) content measured according to ISO 6427. Accordingly the polypropylene composition is preferably featured by a xylene cold soluble (XCS) content in the range of 0.5 to 12.0 wt.-%, more preferably in the range of 1.0 to 11.0 wt.-%, yet more preferably in the range of 1.5 to 10.0 wt.-%.

As stated above the polypropylene composition comprises as main polymer components the propylene homopolymer (H-PP) and the propylene copolymer (C-PP). In the following the polypropylene composition is defined further by its individual components, i.e. by the propylene homopolymer (H-PP) and by the propylene copolymer (C-PP).

The expression propylene homopolymer used in the instant invention relates to a polypropylene that consists substantially, i.e. of more than 99.0 wt.-%, preferably of more than 99.5 wt.-%, more preferably of more than 99.7 wt.-%, still more preferably of at least 99.8 wt.-%, of propylene units. In a preferred embodiment only propylene units in the propylene homopolymer are detectable. The comonomer content can be determined with $^{13}C$ NMR spectroscopy, as described below in the examples.

The propylene homopolymer (H-PP) has preferably a melt flow rate $MFR_2$ (230° C.) measured according to ISO 1133 in the range of 1.5 to 100.0 g/10 min, more preferably in the range of 2.0 to 80.0 g/10 min, still more preferably in the range of 2.5 to 60.0 g/10 min.

The propylene homopolymer (H-PP) of the present invention can be either obtained by a process in which a single site catalyst has been used or a Ziegler-Natta catalyst. Typically the polypropylenes obtained by these two catalyst type differ in their <2,1> regiodefects. Accordingly it is appreciated that the propylene homopolymer has (a) <2,1> regiodefects determined by $^{13}C$-spectroscopy of equal or more than 0.4 mol.-%, more preferably of equal or more than 0.6 mol.-%, like in the range of 0.7 to 0.9 mol.-%, or (b) <2,1> regiodefects determined by $^{13}C$-spectroscopy of less than 0.4 mol.-%, more preferably of equal or less than 0.2 mol.-%, like of equal or less than 0.1 mol.-%.

Further, it is appreciated that the xylene soluble content (XCS) of the propylene homopolymer (H-PP) is rather low. Thus it is preferred that the xylene soluble content (XCS) according to ISO 6427 of the propylene homopolymer (H-PP) is in the range of 0.1 to 3.0 wt.-%, more preferably in the range of 0.1 to below 2.0 wt.-%. In case the propylene homopolymer (H-PP) has <2,1> regiodefects of equal or more than 0.4 mol.-% the xylene soluble content (XCS) according to ISO 6427 is in the range of 0.1 to below 1.5 wt.-%, like in the range of 0.1 to 1.2 wt.-%.

The propylene copolymer (C-PP) according to this invention is featured by a rather high comonomer content, i.e. 1-hexene content. Accordingly the copolymer (C-PP) according to this invention shall have a 1-hexene content in the range of 3.8 to 10.0 wt.-%, more preferably in the range of 4.0 to 8.0 wt.-%, still more preferably in the range of 4.5 to 7.5 wt.-%, like in the range of 4.7 to 5.5 wt.-%.

In a specifically preferred embodiment of the present invention the rather high comonomer content is achieved due to the fact that the inventive copolymer (C-PP) comprises two fractions of propylene copolymer as defined herein. A "comonomer" according to this invention is a polymerizable unit different to propylene. Accordingly, It is preferred that the propylene copolymer (C-PP) comprises b-1) a first random propylene copolymer (A) of propylene and 1-hexene having a 1-hexene content in the range of 0.1 to below 3.5 wt.-%, and b-2) a second random propylene copolymer (B) of propylene and 1-hexene having a higher 1-hexene content than the first random propylene copolymer (A).

According to a further embodiment of the present invention, the copolymer (C-PP) fulfills in-equation (2)

$$4.5 \leq C6(C)/(C6(A)*[A]/[C]) \leq 9.0 \quad (2)$$

wherein

C6(A) is the 1-hexene content of the first random propylene copolymer (A) based on the total weight of the first random propylene copolymer (A) [in wt.-%];

C6(C) is the 1-hexene content of the copolymer (C-PP) based on the total weight of the copolymer (C-PP) [in wt.-%]; and

[A]/[C] is the weight ratio between the first random propylene copolymer (A) and the copolymer (C-PP) [in g/g].

The copolymer (C-PP) comprises a first random propylene copolymer (A) and a second random propylene copolymer (B). The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH]<[H]^2$$

wherein

[HH] is the molar fraction of adjacent comonomer units, like of adjacent 1-hexene units, and

[H] is the molar fraction of total comonomer units, like of total 1-hexene units, in the polymer.

Furthermore, it is preferred that the copolymer (C-PP) of the present invention has a melt flow rate (MFR) given in a specific range. Accordingly, it is preferred that in the present invention the copolymer (C-PP) has a melt flow rate $MFR_2$ (230° C., 2.16 kg) determined according to ISO 1133 in the range of 0.4 to 100.0 g/10 min, more preferably in the range of 0.6 to 50.0 g/10 min, still more preferably in the range of 0.8 to less than 12.0 g/10 min, yet more preferably in the range of 1.0 to less than 9.0 g/10 min, like in the range of 1.0 to 2.0 g/10 min.

Additionally the copolymer (C-PP) can be defined by the xylene cold soluble (XCS) content measured according to ISO 16152 (25° C.). Accordingly the copolymer (C-PP) is preferably featured by a xylene cold soluble (XCS) content in the range of 8.0 to 30.0 wt.-%, more preferably in the range of 9.0 to 28.0 wt.-%, still more preferably in the range of 10.0 to 27.0 wt.-%.

The amount of xylene cold soluble (XCS) additionally indicates that the copolymer (C-PP) is preferably free of any elastomeric polymer component, like an ethylene propylene rubber. In other words the copolymer (C-PP) shall not be a heterophasic polypropylene, i.e. a system consisting of a polypropylene matrix in which an elastomeric phase is dispersed. Such systems are featured by a rather high xylene cold soluble content. Accordingly in a preferred embodiment the copolymer (C-PP) comprises the first random propylene copolymer (A) and the second random propylene copolymer (B) as the only polymer components.

Similar to xylene cold solubles (XCS) the hexane hot solubles (HHS) indicate that part of a polymer which has a low isotacticity and crystallinity and which is soluble in hexane at 50° C.

Accordingly it is preferred that the inventive copolymer (C-PP) has an amount of hexane hot solubles (C6 FDA) measured according to FDA 177.1520 equal or below 1.5 wt.-%, more preferably equal or below 1.2 wt.-%, still more preferably equal or below 1.0 wt.-%, like equal or below 0.7 wt.-%.

The copolymer (C-PP) of the present invention is further defined by its polymer fractions present. Accordingly the copolymer (C-PP) of the present invention comprises at least, preferably consists of, two fractions, namely the first random propylene copolymer (A) and the second random propylene copolymer (B).

The first random propylene copolymer (A) is a copolymer of propylene and 1-hexene having a 1-hexene content in the range of 0.1 to below 3.5 wt.-%, preferably in the range of 0.5 to below 3.5 wt.-%, more preferably in the range of 0.8 to 3.0 wt.-%, still more preferably in the range of 1.0 to 2.5 wt.-%, and the second random propylene copolymer (B) is a copolymer of propylene and 1-hexene having a 1-hexene content in the range of 4.0 to 15.0 wt.-%, preferably in the range of 5.0 to 13.0 wt.-%, more preferably in the range of 6.0 to 12.0 wt.-%, still more preferably in the range of 6.5 to 10.0 wt.-%.

Accordingly, the first random propylene copolymer (A) is the 1-hexene lean fraction while the second random propylene copolymer (B) is the 1-hexene rich fraction.

With regard to the melt flow rate $MFR_2$, the copolymer (C-PP) fulfils in-equation (1), more preferably in-equation (1a), still more preferably in-equation (1b), $$MFR(C\text{-}PP)/MFR(A) \leq 1.0 \quad (1),$$

$$0.5 \leq MFR(C\text{-}PP)/MFR(A) \leq 1.0 \quad (1a),$$

$$0.6 \leq MFR(C\text{-}PP)/MFR(A) \leq 0.9 \quad (1b),$$

wherein MFR(A) is the melt flow rate $MFR_2$ (230° C., 2.16 kg) determined according to ISO 1133 in [g/10 min] of the first random propylene copolymer (A) and MFR(C-PP) is the melt flow rate $MFR_2$ (230° C., 2.16 kg) determined according to ISO 1133 in [g/10 min] of the copolymer (C-PP).

Further, it is appreciated that the first random propylene copolymer (A) has a melt flow rate $MFR_2$ (230° C., 2.16 kg) determined according to ISO 1133 in the range of 0.3 to 12.0 g/10 min, more preferably in the range of 0.5 to 9.0 g/10 min, still more preferably in the range of 0.8 to 3.0 g/10 min, like in the range of 1.0 to 2.5 g/10 min.

The second propylene copolymer (B) preferably has a has a melt flow rate $MFR_2$ (230° C., 2.16 kg) determined according to ISO 1133 in the range of 0.2 to 9.0 g/10 min, more preferably in the range of 0.4 to 8.0 g/10 min, still more preferably in the range of 0.6 to 2.0 g/10 min, like in the range of 0.9 to 1.5 g/10 min.

Preferably the weight ratio between the first random propylene copolymer (A) and the second random propylene copolymer (B) within the copolymer (C-PP) is in the range of 30:70 to 70:30, more preferably in the range of 35:65 to 65:35, still more preferably in the range of 40:60 to 60:40.

In particular, it is preferred that the copolymer (C-PP) comprises 30.0 to 70.0 wt.-%, more preferably 35.0 to 65.0 wt.-%, still more preferably 40.0 to 60.0 wt.-% of the first random propylene copolymer (A) and 30.0 to 70.0 wt.-%, more preferably 35.0 to 65.0 wt.-%, still more preferably 40.0 to 60.0 wt.-% of the second random propylene copolymer (B), based on the overall weight of the copolymer (C-PP).

Further, it is preferred that the copolymer (C-PP) has an amount of 2,1 erythro regio-defects in the range of 0.1 to 2.0 mol.-%, preferably in the range of 0.1 to 1.0 mol.-%, more preferably in the range of 0.1 to 0.5 mol.-%, yet more preferably in the range of 0.1 to 0.4 mol.-%.

The copolymer (C-PP) is in particular obtainable, preferably obtained, by a process as defined in detail below.

The process for the preparation of a copolymer (C-PP) forming the polypropylene composition (P) as defined above is a sequential polymerization process comprising at least two reactors connected in series, wherein said process comprises the steps of (A) polymerizing in a first reactor (R-1) being a slurry reactor (SR), preferably a loop reactor (LR), propylene and 1-hexene, obtaining a first random propylene copolymer (A) as defined in the instant invention, (B) transferring said first random propylene copolymer (A) and unreacted comonomers of the first reactor (R-1) in a second reactor (R-2) being a gas phase reactor (GPR-1), (C) feeding to said second reactor (R-2) propylene and 1-hexene, (D) polymerizing in said second reactor (R-2) and in the presence of said first random propylene copolymer (A) propylene and 1-hexene, obtaining a second random propylene copolymer (B) as defined in the instant invention, said first random propylene copolymer (A) and said second random propylene copolymer (B) form the copolymer (C-PP) as defined in the instant invention, wherein further in the first reactor (R-1) and second reactor (R-2) the polymerization takes place in the presence of a solid catalyst system (SCS), said solid catalyst system (SCS) comprises (i) a transition metal compound of formula (I)

$$R_n(Cp)_2MX_2 \quad (I)$$

wherein

"M" is zirconium (Zr) or hafnium (Hf), each "X" is independently a monovalent anionic σ-ligand, each "Cp" is a cyclopentadienyl-type organic ligand independently selected from the group consisting of unsubstituted or substituted and/or fused cyclopentadienyl, substituted or unsubstituted indenyl or substituted or unsubstituted fluorenyl, said organic ligands coordinate to the transition metal (M), "R" is a bivalent bridging group linking said organic ligands (Cp), "n" is 1 or 2, preferably 1, and (ii) optionally a cocatalyst (Co) comprising an element (E) of group 13 of the periodic table (IUPAC), preferably a cocatalyst (Co) comprising a compound of Al and/or B.

Concerning the definition of the copolymer (C), the first random propylene copolymer (A) and the second random propylene copolymer (B) it is referred to the definitions given above.

The solid catalyst system (SCS) is defined in more detail below.

Due to the use of the solid catalyst system (SCS) in a sequential polymerization process the manufacture of the above defined copolymer (C-PP) is possible. In particular due to the preparation of a propylene copolymer, i.e. the first random propylene copolymer (A), in the first reactor (R-1) and the conveyance of said propylene copolymer (A) and especially the conveyance of unreacted comonomers into the second reactor (R-2) it is possible to produce a copolymer (C-PP) with high comonomer content in a sequential polymerization process. Normally the preparation of a propylene copolymer with high comonomer content in a sequential polymerization process leads to fouling or in severe cases to the blocking of the transfer lines as normally unreacted comonomers condensate at the transfer lines. However with the new method the conversion of the comonomers is increased and therewith a better incorporation into the polymer chain leading to higher comonomer content and reduced stickiness problems is achieved.

The term "sequential polymerization process" indicates that the copolymer (C-PP) is produced in at least two reactors connected in series. More precisely the term "sequential polymerization process" indicates in the present application that the polymer of the first reactor (R-1) is directly conveyed with unreacted comonomers to the second reactor (R-2). Accordingly the decisive aspect of the present process is the preparation of the copolymer (C-PP) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two polymerization reactors (R-1) and (R-2). The term "polymerization reactor" shall indicate that the main polymerization takes place there. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is a slurry reactor (SR) and can be any continuous or simple stirred batch tank reactor or loop reactor operating in slurry. According to the present invention the slurry reactor (SR) is preferably a loop reactor (LR).

The second reactor (R-2) and any subsequent reactor are gas phase reactors (GPR). Such gas phase reactors (GPR) can be any mechanically mixed or fluidized bed reactors. Preferably, the gas phase reactor(s) (GPR) comprise a mechanically agitated fluidized bed reactor with gas velocities of at least 0.2 m/sec. Thus it is appreciated that the gas phase reactor (GPR) is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is a slurry reactor (SR), like a loop reactor (LR), whereas the second reactor (R-2) is a gas phase reactor (GPR-1). The subsequent reactors—if present—are also gas phase reactors (GPR).

A preferred multistage process is a "loop-gas phase"-process, such as developed by Borealis NS, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976.

Preferably, in the instant process for producing the copolymer (C-PP) as defined above the conditions for the first reactor (R-1), i.e. the slurry reactor (SR), like a loop reactor (LR), of step (A) may be as follows:

the temperature is within the range of 40° C. to 110° C., preferably between 60° C. and 100° C., more preferably in the range of 65 to 90° C., the pressure is within the range of 20 bar to 80 bar, preferably between 40 bar to 70 bar, hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:

the temperature is within the range of 50° C. to 130° C., preferably between 60° C. and 100° C., the pressure is within the range of 5 bar to 50 bar, preferably between 15 bar to 40 bar, hydrogen can be added for controlling the molar mass in a manner known per se.

The residence time can vary in both reactor zones.

In one embodiment of the process for producing the copolymer (C-PP) the residence time in the slurry reactor (SR), e.g. loop (LR) is in the range 0.2 to 4.0 hours, e.g. 0.3 to 1.5 hours and the residence time in the gas phase reactor (GPR) will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

The copolymer (C) according to the present invention is prepared in the presence of a solid catalyst system (SCS) comprising a transition metal compound.

In a preferred embodiment the transition metal compound has the formula (I)

$$R_n(Cp)_2MX_2 \quad (I)$$

wherein each Cp independently is an unsubstituted or substituted and/or fused cyclopentadienyl ligand, e.g. substituted or unsubstituted cyclopentadienyl, substituted or unsubstituted indenyl or substituted or unsubstituted fluorenyl ligand; the optional one or more substituent(s) being independently selected preferably from halogen, hydrocarbyl (e.g. C1-C20-alkyl, C2-C20-alkenyl, C2-C20-alkynyl, C3-C12-cycloalkyl, C6-C20-aryl or C7-C20-arylalkyl), C3-C12-cycloalkyl which contains 1, 2, 3 or 4 heteroatom(s) in the ring moiety, C6-C20-heteroaryl, C1-C20-haloalkyl, —SiR"3, —OSiR"3, —SR", —PR"2, OR" or —NR"2, each R" is independently a hydrogen or hydrocarbyl, e.g. C1-C20-alkyl, C2-C20-alkenyl, C2-C20-alkynyl, C3-C12-cycloalkyl or C6-C20-aryl; or e.g. in case of —NR"2, the two substituents R" can form a ring, e.g. five- or six-membered ring, together with the nitrogen atom to which they are attached;

R is a bridge of 1-3 atoms, e.g. a bridge of 1-2 C-atoms and 0-2 heteroatoms, wherein the heteroatom(s) can be e.g. Si, Ge and/or O atom(s), wherein each of the bridge atoms may bear independently substituents, such as C1-C20-alkyl, tri(C1-C20-alkyl)silyl, tri(C1-C20-alkyl)siloxy or C6-C20-aryl substituents); or a bridge of 1-3, e.g. one or two, hetero atoms, such as silicon, germanium and/or oxygen atom(s), e.g. —SiR$^{10}$2, wherein each R$^{10}$ is independently C1-C20-alkyl, C3-C12 cycloalkyl, C6-C20-aryl or tri(C1-C20-alkyl) silyl-residue, such as trimethylsilyl;

M is a transition metal of Group 4, e.g. Zr or Hf, especially Zr;

each X is independently a sigma-ligand, such as H, halogen, C1-C20-alkyl, C1-C20-alkoxy, C2-C20-alkenyl, C2-C20-alkynyl, C3-C12-cycloalkyl, C6-C20-aryl, C6-C20-aryloxy, C7-C20-arylalkyl, C7-C20-arylalkenyl, —SR", —PR"$_3$, —SiR"3, —OSiR"3, —NR"$_2$ or —CH$_2$-Y, wherein Y is C6-C20-aryl, C6-C20-heteroaryl, C1-C20-alkoxy, C6-C20-aryloxy, NR"$_2$, —SR", —PR"$_3$, —SiR"$_3$, or —OSiR"$_3$;

each of the above mentioned ring moieties alone or as a part of another moiety as the substituent for Cp, X, R" or R can further be substituted e.g. with C1-C20-alkyl which may contain Si and/or O atoms;

n is 1 or 2.

Suitably, in each X being —CH2-Y, each Y is independently selected from C6-C20-aryl, NR"$_2$, SiR"$_3$ or —OSiR"$_3$. Most preferably, X being —CH2-Y is benzyl. Each X other than —CH$_2$—Y is independently halogen, C1-C20-alkyl, C1-C20-alkoxy, C6-C20-aryl, C7-C20-arylalkenyl or —NR"$_2$ as defined above, e.g. —N(C1-C20-alkyl)$_2$.

Preferably, each X is halogen, methyl, phenyl or —CH2-Y, and each Y is independently as defined above.

Cp is preferably cyclopentadienyl, indenyl or fluorenyl, optionally substituted as defined above. Ideally Cp is cyclopentadienyl or indenyl.

In a suitable subgroup of the compounds of formula (I), each Cp independently bears 1, 2, 3 or 4 substituents as defined above, preferably 1, 2 or 3, such as 1 or 2 substituents, which are preferably selected from C1-C20-alkyl, C6-C20-aryl, C7-C20-arylalkyl (wherein the aryl ring alone or as a part of a further moiety may further be substituted as indicated above), OR"$_3$, wherein R" is as indicated above, preferably C1-C20-alkyl.

R, is preferably a methylene, ethylene or a silyl bridge, whereby the silyl can be substituted as defined above, e.g. a (dimethyl)Si=, (methylphenyl)Si=, (methylcylcohexyl)silyl= or (trimethylsilylmethyl)Si=; n is 0 or 1.

A specific subgroup includes the well known metallocenes of Zr and Hf with two eta5-ligands which are bridged with cyclopentadienyl ligands optionally-substituted with e.g. alkoxy, or alkyl (e.g. C1-6-alkyl) as defined above, or with two bridged indenyl ligands optionally substituted in any of the ring moieties with e.g. alkoxy or alkyl as defined above, e.g. at 2-, 3-, 4- and/or 7-positions. Preferred bridges are ethylene or —SiMe$_2$. The preparation of the metallocenes can be carried out according or analogously to the methods known from the literature and is within skills of a person skilled in the field. Thus for the preparation see e.g. EP-A-129 368, examples of compounds wherein the metal atom bears a —NR"2 ligand see i.a. in WO-A-985683 1 and WO-A-0034341. For the preparation see also e.g. in EP-A-260 130. WO-A-9728170, WO-A-9846616, WO-A-9849208, WO-A-9912981, WO-A-9919335, WO-A-9856831, WO-A-00 34341, EP-A-423 101 and EP-A-537 130.

The complexes of the invention are preferably asymmetrical. That means simply that the two indenyl ligands forming the metallocene are different, that is, each indenyl ligand bears a set of substituents that are either chemically different, or located in different positions with respect to the other indenyl ligand. More precisely, they are chiral, racemic bridged bisindenyl metallocenes. Whilst the complexes of the invention may be in their syn configuration ideally, they are in their anti configuration. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane.

Preferred complexes of the invention are of formula (II') or (II)

(IV)

(II')

wherein
M is Zr;
each X is a sigma ligand, preferably each X is independently a hydrogen atom, a halogen atom, a C1-C6 alkoxy group, C1-C6 alkyl, phenyl or a benzyl group;
L is a divalent bridge selected from —R'$_2$C—, —R'$_2$C-CR'$_2$, —R'2Si—, —R'2Si—SiR'$_2$—, —R'$_2$Ge—, wherein each R' is independently a hydrogen atom, C1-C20 alkyl, C3-C10 cycloalkyl, tri(C1-C20-alkyl) silyl, C6-C20-aryl, C7-C20 arylalkyl
each $R^2$ or $R^{2'}$ is a C1-C10 alkyl group;
$R^{5'}$ is a C1-C10 alkyl group or a Z'R3' group;
$R^6$ is hydrogen or a C1-C10 alkyl group;
$R^{6'}$ is a C1-C10 alkyl group or a C6-C10 aryl group;
$R^7$ is hydrogen, a C1-C6 alkyl group or a ZR3 group;
$R^{7'}$ is hydrogen or a C1-C10 alkyl group;
Z and Z' are independently O or S;
$R^{3'}$ is a C1-C10 alkyl group, or a C6-C10 aryl group optionally substituted by one or more halogen groups;
$R^3$ is a C1-C10 alkyl group;
each n is independently 0 to 4, e.g. 0, 1 or 2;
and each $R^1$ is independently a C1-C20 hydrocarbyl group, e.g. a C1-C10 alkyl group.

Particularly preferred compounds of the invention include:
rac-anti-Me$_2$Si(2-Me-4-Ph-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-Ph-5-OMe-6-tBu-Ind)ZrCl$_2$
rac-anti-Me$_2$Si(2-Me-4-(3,5-di-tBuPh)-6-tBu-Ind)(2-Me-4-Ph-5-OMe-6-tBu-Ind)ZrCl$_2$
rac-anti-Me2Si(2-Me-4-(p-tBuPh)-Ind)(2-Me-4-Ph-5-OC$_6$F5)-6-iPr-Ind)ZrCl$_2$
rac-anti-Me(CyHex)Si(2-Me-4-Ph-6-tBu-Ind)(2-Me-4-Ph-5-OMe-6-tBu-Ind)ZrCl$_2$
rac-anti-Me$_2$Si(2-Me-4-(3,5-di-tBuPh)-7-Me-Ind)(2-Me-4-Ph-5-OMe-6-tBu-Ind)ZrCl$_2$
rac-anti-Me$_2$Si(2-Me-4-(3,5-di-tBuPh)-7-OMe-Ind)(2-Me-4-Ph-5-OMe-6-tBu-Ind)ZrCl$_2$
rac-anti-Me$_2$Si(2-Me-4-(p-tBuPh)-6-tBu-Ind)(2-Me-4-Ph-5-OMe-6-tBu-Ind)ZrCl$_2$
rac-anti-Me$_2$Si(2-Me-4-(p-tBuPh)-Ind)(2-Me-4-(4-tBuPh)-5-OMe-6-tBu-Ind)ZrCl$_2$
rac-anti-Me$_2$Si(2-Me-4-(p-tBuPh)-Ind)(2-Me-4-(3,5-tBu2Ph)-5-OMe-6-tBu-Ind)ZrCl$_2$
rac-anti-Me$_2$Si(2-Me-4-(p-tBuPh)-Ind)(2-Me-4-Ph-5-OtBu-6-tBu-Ind)ZrCl$_2$.

The most preferred metallocene complex (procatalyst) is rac-anti-dimethylsilandiyl(2-methyl-4-phenyl-5-methoxy-6-tert-butyl-indenyl)(2-methyl-4-(4-tert-butylphenyl)indenyl)zirconium dichloride.

Besides the metallocene complex (procatalyst), the metallocene catalyst comprises additionally a cocatalyst as defined in WO 2015/011135 A1. Accordingly the preferred cocatalyst is methylaluminoxane (MAO) and/or a borate, preferably trityl tetrakis(pentafluorophenyl)borate.

It is especially preferred that the metallocene catalyst is unsupported, i.e. no external carrier is used. Regarding the preparation of such a metallocene complex again reference is made to WO 2015/011135 A1.

The present invention is further directed to an article comprising at least 90.0 wt.-% of the polypropylene composition as defined above.

Preferably, the article comprises at least 95.0 wt.-% of the polypropylene composition, more preferably at least 97.0 wt.-%, still more preferably at least 98.0 wt.-%, like at least 99.9 wt.-%. It is especially preferred that the article consists of the polypropylene composition.

It is preferred that the article is a film. The film according to this invention can be obtained in a conventional manner for instance by cast film technology or extrusion blown film technology. Said film will typically have a thickness in the range of 15 to 300 μm, preferably in the range of 20 to 250 μm, like in the range of 30 to 200 μm.

Preferably, the film has a haze before sterilization determined according to ASTM D 1003-00 measured on a 50 μm cast film of below 10.0%, more preferably below 8.0%, still more preferably below 7.5%, and a haze after sterilization determined according to ASTM D 1003-00 measured on a 50 μm cast film of below 12.0%, more preferably below 10.0%, still more preferably below 9.0%, like below 8.5%.

In another preferred embodiment, the invention is also directed to moulded articles, preferably injection moulded articles comprising at least 90.0 wt.-% of the instant polymer composition designed for technical applications, like automotive applications and consumer products Examples 1. Measuring Methods The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the NOE at short recycle delays of 3s (Klimke, K., Parkinson, M., Piel, C., Kaminsky, W., Spiess, H. W., Wilhelm, M., Macromol. Chem. Phys. 2006; 207: 382., Pollard, M., Klimke, K., Graf, R., Spiess, H. W., Wilhelm, M., Sperber, O., Piel, C., Kaminsky, W., Macromolecules 2004; 37:813.). and the RS-HEPT decoupling scheme (Filip, X., Tripon, C., Filip, C., J. Mag. Resn. 2005, 176, 239., Griffin, J. M., Tripon, C., Samoson, A., Filip, C., and Brown, S. P., Mag. Res. in Chem. 2007 45, 51, S198). A total of 16384 (16 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$$P_{21e}=(I_{e6}+I_{e8})/2$$

The amount of 1,2 primary inserted propene was quantified based on the methyl region with correction undertaken for sites included in this region not related to primary insertion and for 10 primary insertion sites excluded from this region:

$$P_{12}=I_{CH3}+P_{12e}$$

The total amount of propene was quantified as the sum of primary inserted propene and all other present regio defects:

$$P_{total}=P_{12}+P_{21e}$$

The mole percent of 2,1 erythro regio defects was quantified with respect to all propene:

$$[2,1e]\ mol\ \%=100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. 20 Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

Characteristic signals corresponding to the incorporation of 1-hexene were observed and the comonomer content quantified in the following way.

The amount of 1-hexene incorporated in PHP isolated sequences was quantified using the integral of the αB4 sites at 44.2 ppm accounting for the number of reporting sites per comonomer:

$$H=I_{\alpha B4}/2$$

The amount of 1-hexene incorporated in PHHP double consecutive sequences was quantified using the integral of the ααB4 site at 41.7 ppm accounting for the number of reporting sites per comonomer:

$$HH=2*I_{\alpha\alpha B4}$$

When double consecutive incorporation was observed the amount of 1-hexene incorporated in PHP isolated sequences needed to be compensated due to the overlap of the signals αB4 and αB4B4 at 44.4 ppm:

$$H=(I_{\alpha B4}-2*I_{\alpha\alpha B4})/2$$

The total 1-hexene content was calculated based on the sum of isolated and consecutively incorporated 1-hexene:

$$H\text{total}=H+HH$$

When no sites indicative of consecutive incorporation observed the total 1-hexeen comonomer content was calculated solely on this quantity:

$$H\text{total}=H$$

Characteristic signals indicative of regio 2,1-erythro defects were observed (Resconi, L., Cavallo, L., Fait, A., Piemontesi, F., Chem. Rev. 2000, 100, 1253).

The presence of 2,1-erythro regio defects was indicated by the presence of the Pαβ (21e8) and Pαγ (21e6) methyl sites at 17.7 and 17.2 ppm and confirmed by other characteristic signals.

The total amount of secondary (2,1-erythro) inserted propene was quantified based on the αα21e9 methylene site at 42.4 ppm:

$$P21=I_{\alpha\alpha 21e9}$$

The total amount of primary (1,2) inserted propene was quantified based on the main Sαα methylene sites at 46.7 ppm and compensating for the relative amount of 2,1-erythro, αB4 and ααB4B4 methylene unit of propene not accounted for (note H and HH count number of hexene monomers per sequence not the number of sequences):

$$P12=I_{s\alpha\alpha}+2*P21+H+HH/2$$

The total amount of propene was quantified as the sum of primary (1,2) and secondary (2,1-erythro) inserted propene:

$$P\text{total}=P12+P21=I_{s\alpha\alpha}+3*I_{\alpha\alpha}21e9+(I_{\alpha B4}-2*I_{\alpha\alpha B4})/2+I_{\alpha\alpha B4}$$

This simplifies to:

$$P\text{total}=I_{s\alpha\alpha}+3*I_{\alpha\alpha 21e9}+0.5*I_{\alpha B4}$$

The total mole fraction of 1-hexene in the polymer was then calculated as:

$$fH=H\text{total}/(H\text{total}+P\text{total})$$

The full integral equation for the mole fraction of 1-hexene in the polymer was:

$$fH=(((I\alpha B4-2*I\alpha\alpha B4)/2)+(2*I\alpha\alpha B4))/((I_{s\alpha\alpha}+3*I\alpha\alpha 21e9+0.5*B4+((I\alpha B4-2*I\alpha\alpha B4)/2)+(2*I\alpha\alpha B4))$$

This simplifies to:

$$fH=(I\alpha B4/2+I\alpha\alpha B4)/(I_{s\alpha\alpha}+3*I\alpha\alpha 21e9+I\alpha B4+I\alpha\alpha B4)$$

The total comonomer incorporation of 1-hexene in mole percent was calculated from the mole fraction in the usual manner:

$$H\,[\text{mol }\%]=100*fH$$

The total comonomer incorporation of 1-hexene in weight percent was calculated from the mole fraction in the standard manner:

$$H[\text{wt }\%]=100*(fH*84.16)/((fH*84.16)+((1-fH)*42.08))$$

Calculation of comonomer content of the second random propylene copolymer (B):

$$\frac{C(CPP)-w(A)\times C(A)}{w(B)}=C(B)$$

wherein
w(A) is the weight fraction of the first random propylene copolymer (A),
w(B) is the weight fraction of the second random propylene copolymer (B),
C(A) is the comonomer content [in wt.-%] measured by $^{13}$C NMR spectroscopy of the first random propylene copolymer (A), i.e. of the product of the first reactor (R1),
C(CPP) is the comonomer content [in wt.-%] measured by $^{13}$C NMR spectroscopy of the product obtained in the second reactor (R2), i.e. the mixture of the first random propylene copolymer (A) and the second random propylene copolymer (B) [of the propylene copolymer (C-PP)],
C(B) is the calculated comonomer content [in wt.-%] of the second random propylene copolymer (B).

Melt Flow Rate (MFR)

The melt flow rate (MFR) of the polymer composition is measured according to ISO 1133 (230° C., 2.16 kg load). The melt flow rate is measured as the MFR$_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

Calculation of melt flow rate MFR$_2$ (230° C., 2.16 kg) of the second random propylene copolymer (B):

$$MFR(B)=10^{\left[\frac{\log(MFR(C))-w(A)\times\log(MFR(A))}{w(B)}\right]}$$

wherein
w(A) is the weight fraction of the first random propylene copolymer (A),
w(B) is the weight fraction of the second random propylene copolymer (B), MFR(A) is the melt flow rate MFR$_2$ (230° C., 2.16 kg) [in g/10 min] measured according ISO 1133 of the first random propylene copolymer (A),
MFR(C) is the melt flow rate MFR$_2$ (230° C., 2.16 kg) [in g/10 min] measured according ISO 1133 of the Polypropylene composition (P),
MFR(B) is the calculated melt flow rate MFR$_2$ (230° C., 2.16 kg) [in g/10 min] of the second random propylene copolymer (B).

The Xylene Soluble Fraction at Room Temperature (XCS, Wt.-%)

The amount of the polymer soluble in xylene is determined at 25° C. according to ISO 16152; 5th edition; 2005-07-01.

Hexane Solubles (C6 FDA, Wt.-%)
FDA Section 177.1520

1 g of a polymer film of 100 μm thickness is added to 400 ml hexane at 50° C. for 2 hours while stirring with a reflux cooler.

After 2 hours the mixture is immediately filtered on a filter paper N°41.

The precipitate is collected in an aluminium recipient and the residual hexane is evaporated on a steam bath under N$_2$ flow.

The amount of hexane solubles is determined by the formula $$((\text{wt. sample}+\text{wt. crucible})-(\text{wt crucible}))/(\text{wt. sample})\cdot 100.$$

Flexural Modulus

The flexural modulus was determined in 3-point-bending at 23° C. according to ISO 178 on 80×10×4 mm3 test bars injection moulded in line with EN ISO 1873-2.

Notched Impact Strength (NIS)

The Charpy notched impact strength was measured according to ISO 179 1eA at +23° C. and −20° C., using injection moulded bar test specimens of 80×10×4 mm$^3$ prepared in accordance with EN ISO 1873-2.

Haze

Haze determined according to ASTM D1003-00 on 60×60×1 mm3 plaques injection moulded in line with EN ISO 1873-2. Haze denominates a haze value determined on 1 mm thick plaques. Haze (film) denominates a haze value determined according to ASTM D1003-00 on films of 50 μm thickness.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

Tensile modulus in machine and transverse direction were determined according to ISO 527-3 on 50 μm cast films at a cross head speed of 1 mm/min.

Relative Total Penetration Energy (Dyna)

The impact strength of films is determined by the "Dynatest" method according to ISO 7725-2 at 23° C. and 0° C. on cast films with a thickness of 50 μm. The value "Dyna (23° C.) or Dyna (0° C.)" [J/mm] represents the relative total penetration energy per mm thickness that a film can absorb before it breaks divided by the film thickness. The higher this value, the tougher the material is.

Stress Whitening

Figure 1:
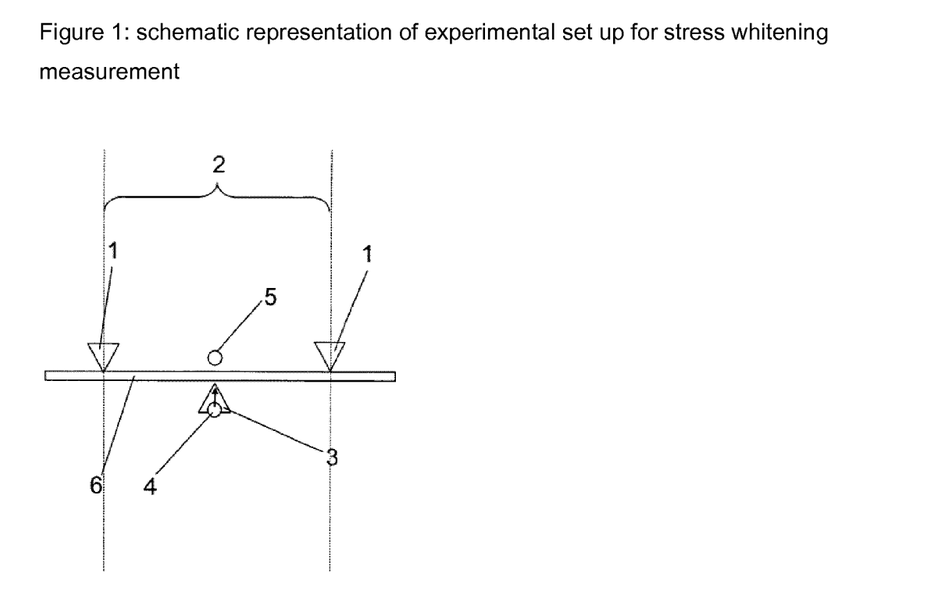
FIG. 1 is a schematic representation of experimental set up for stress whitening measurement.

Stress whitening is determined by a modified three point bending test, namely the reversed three point bending test, (cf. FIG. 1).

The reversed three point bending test is carried out on a universal testing machine (Zwick Z010) at 50 mm/min. The samples are 2 mm thick injection moulded UL94 specimens (125×12.5×2 mm).

The experimental set-up consists of the reversed three point bending test coupled with an optical detection system.

The mechanical set up consists of:
a fixed part (1), with a span (2) of 40 mm, a moving part including a loading edge (3) with a light source (4) and an optical sensor (5) fixed on the moving part closely above and beneath the specimen (6) by a vertical rod. This ensures that the distance between light source and optical sensor remains constant during the test, which is a prerequisite for a good reproducibility of the measurements.

The force-deflection and the optical signal-deflection curves are recorded. At the beginning of the test, the optical signal (7) is calibrated to 100% (7a), regardless of the initial transparency/haziness of the inserted sample.

Figure 2:
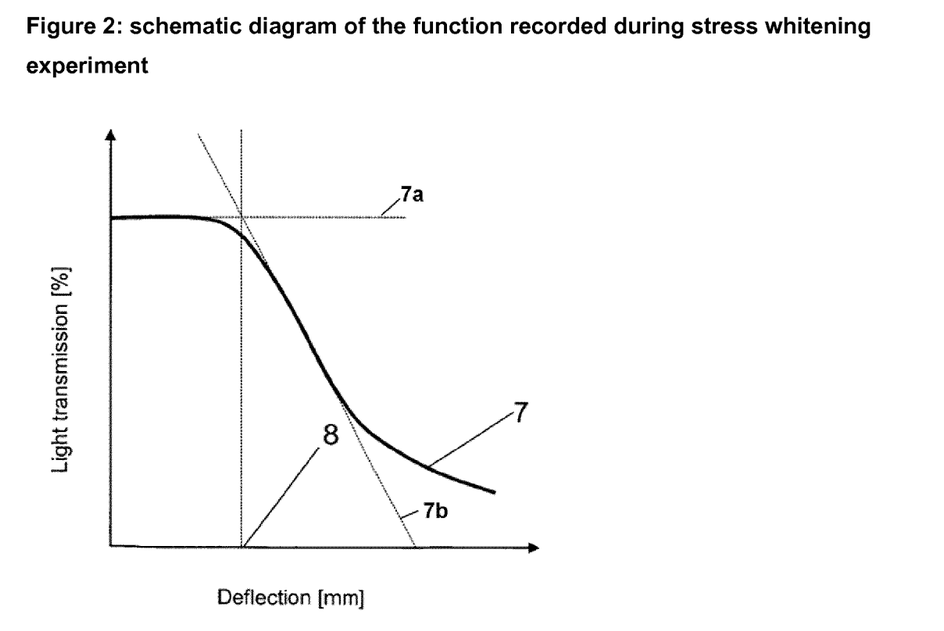
FIG. 2 is a schematic diagram of the function recorded during stress whitening experiment.

Occurrence of stress whitening is correlated with a sharp drop in the optical signal-deflection curve (cf. FIG. 2).

Three different parameters are determined:
a) Stress whitening angle,
b) Residual size (width) of the blushing zones
c) Stress whitening intensity a) The stress whitening angle [°] (SW angle), (also: bending angle or onset-angle) indicates, at which bending angle stress whitening (SW) occurs. The occurrence of stress whitening is correlated with a sharp drop of the optical response (light transmission) during bending (cf. FIG. 2,).

The onset angle for stress whitening is determined according to formula (VI):

$$\text{Onset angle} = (3*10^{-5}*s^4) - (2.1*10^{\oplus 3}*s^3) - (3.48*10^{-2}*s^2) - (6.4591*s) - 0.9997 \quad (VI)$$

wherein

"s" denominates the deflection of the loading edge, at which the light transmission curve drops and is determined as illustrated in FIG. 2:

At the beginning of the test, the optical signal (7) is calibrated to 100% (7a), regardless of the initial transparency/haziness of the inserted sample. The deflection of the loading edge (s), at which the in the light transmission curve drops is determined by the abscissa-value (8) of the intersection between the tangent of the slope of the optical signal (7b) and the 100% line of the initial optical signal (7a)

b) Residual size (width) of the blushing zones immediately after a bending of 90°, measured in [mm], also denominated as "Res-SW 90°" or "residual stress whitening (Res-SW)";

The width of a blushing zone (b) is determined as follows:
Tests are conducted to a deflection corresponding to an angle of 90° according to the formula (VI) above. Then the specimen is abruptly unloaded with a crosshead speed of 400 mm/min. The width of the blushing area is measured immediately after testing using a slide gage.

c) Stress whitening intensity (SW intensity): this is the residual intensity of the blushing zone immediately after a bending of 90 deg. C (visual appreciation from 0 to 5, with 0: no remaining blush, 5: intensive whitening), also denominated as "SW-intensity".

Evaluation of the Stress Whitening Intensity:
A mark of 0 is attributed when there is no residual blushing; a note of 5 when the whitening of the deformed zone is extremely pronounced. The obtained value is entered manually in a result sheet; average calculations are automated. The determination of these parameters is somewhat subjective and dependent on an operator. Although the obtained values are somewhat subjective they give essential information on the elastic recovery potential of the material.

What is important to notice, is:
a. an intensity of 0 is remarkably low (i.e. no blushing visible)
b. an intensity of up to 1 is excellent,
c. an intensity between 1.1 and 1.5 is good;
d. an intensity between 1.6 and 3 is acceptable;
e. an intensity higher than 3 is insufficient.

2. Material description

Polypropylene homopolymer (H-PP):
The H-PP used in IEs and CEs in the present invention is the polypropylene homopolymer Bormed HD800CF (denoted in the tables as HD800CF), commercially available from Borealis AG, with a $MFR_2$ of 8 g/10 min and a melting temperature Tm of 164° C.

Propylene copolymer (C-PP):
The production of the C-PP used in the IEs of the present invention is described below.

Preparation of the Catalyst
The catalyst used in the C-PP production is prepared as described in detail in WO 2015/011135 A1 (metallocene complex MC1 with methylaluminoxane (MAO) and borate resulting in Catalyst 3 described in WO 2015/011135 A1) with the proviso that the surfactant is 2,3,3,3-tetrafluoro-2-(1,1,2,2,3,3,3-heptafluoropropoxy)-1-propanol.

The metallocene complex (MC1 in WO 2015/011135 A1) is prepared as described in WO 2013/007650 A1 (metallocene E2 in WO 2013/007650 A1).

Preparation of the Polypropylene copolymer (C-PP)
The Polypropylene copolymer (denoted in the tables as C-PP) were prepared in a sequential process comprising a loop reactor and a gas phase reactor. The reaction conditions are summarized in Table 1.

TABLE 1

Preparation of the Polypropylene copolymer (C-PP)

|  |  | C-PP |
|---|---|---|
| Prepolymerization |  |  |
| Temperature | [° C.] | 20 |
| Catalyst feed | [g/h] | 2.5 |
| TEAL/C3 | [g/t] | 0 |
| C3 feed | [kg/h] | 60.7 |
| H2 feed | [g/h] | 0.5 |
| Residence time | [h] | 0.2 |
| Loop (R1) |  |  |
| Temperature | [° C.] | 70 |
| Pressure | [kPa] | 5292 |
| H2/C3 ratio | [mol/kmol] | 0.08 |
| C6/C3 ratio | [mol/kmol] | 14.1 |
| $MFR_2$ | [g/10 min] | 1.8 |
| XCS | [wt.-%] | 1.9 |
| C6 | [wt.-%] | 1.7 |
| Residence time | [h] | 0.5 |
| Split | [wt.-%] | 42.0 |
| GPR (R2) |  |  |
| Temperature | [° C.] | 80 |
| Pressure | [kPa] | 2406 |
| H2/C3 ratio | [mol/kmol] | 0.8 |
| C6/C3 ratio | [mol/kmol] | 9.2 |
| C6 (GPR) | [wt.-%] | 8.2 |
| $MFR_2$ (GPR) | [g/10 min] | 1.2 |

TABLE 1-continued

Preparation of the Polypropylene copolymer (C-PP)

|  |  | C-PP |
|---|---|---|
| Residence time | [h] | 2.6 |
| Split | [wt.-%] | 58.0 |
| MFR$_2$ (copolymer) | [g/10 min] | 1.4 |
| MFR(C-PP)/MFR(A) | [—] | 0.74 |

The polymer modifier used in CE2 is a polypropylene bases polymer TAFMER™ PN2060 (denoted in the tables as PN2060) specialized on stress whitening reduction for polypropylene, commercially available from Mitsui Chemicals, with a MFR$_2$ of 6.0 g/10 min and a melting temperature Tm of 160° C.

3. Examples

The polypropylene compositions were prepared by mixing in a co-rotating twin-screw extruder ZSK18 from Coperion with a typical screw configuration and a melt temperature in the range of 200-220° C. The melt strands were solidified in a water bath followed by strand pelletization. Injection moulded specimens are prepared and characterized.

The cast films were produced on a Collin lab scale cast film line with slit die and chill roll. The melt temperature is 250° C., throughput is 7 kg/h, chill roll temperature is 15° C. The film thickness is 50 μm.

The properties of the examples are listed in Table 2.

TABLE 2

Properties of the polymer compositions

|  | Units | CE1 | CE2 | IE1 | IE2 | IE3 |
|---|---|---|---|---|---|---|
| HD800CF |  | 100 | 90 | 90 | 80 | 70 |
| C-PP |  |  |  | 10 | 20 | 30 |
| PN2060 |  |  | 10 |  |  |  |
| MFR | g/10 min | 7.32 | 7.8 | 6.83 | 4.87 | 4.25 |
| XCS | wt.-% | 2.76 | 10.13 | 2.9 | 4.02 | 6.43 |
| Standard |  |  |  |  |  |  |
| Haze(1 mm) | % | 41 | 34 | 44 | 40 | 37 |
| Flexure modulus | MPa | 1436 | 1062 | 1495 | 1394 | 1294 |
| NIS/23° C. | kJ/m$^2$ | 3.2 | 4.78 | 3.21 | 3.77 | 4.3 |
| SW-intensity | — | 3 | 3 | 2 | 2 | 2.67 |
| Res-SW | — | 2.64 | 2.58 | 2.26 | 2.2 | 2.48 |
| SW angle | ° | 29.04 | 39.83 | 32.08 | 34.91 | 38.18 |
| Film |  |  |  |  |  |  |
| Haze(film)/b.s. | % | 6.38 | 2.28 | 6.49 | 3.43 | 1.83 |
| Haze(film)/a.s. | % | 8.05 | 2.86 | 6.76 | 4.05 | 2.39 |
| Dyna (23° C.) | J/mm | 15.8 | 17.1 | 17.2 | 16.3 | 17.1 |
| Dyna (0° C.) | J/mm | 0.3 | 0.4 | 0.3 | 0.3 | 0.3 |
| C6 FDA | wt.-% | 1.34 | 2.28 | 1.52 | 1.55 | 1.48 |
| Tensile modulus (film) | MPa | 848 | 652 | 838 | 731 | 696 |

The data in Table 2 clearly show that the inventive examples have good impact strength, low haze and reduced stress whitening in comparison to the comparative examples. The data provided show that the object of the present invention is clearly fulfilled.

The invention claimed is:

1. A polypropylene composition comprising:
   a) propylene homopolymer (H-PP) and
   b) propylene copolymer (C-PP) of propylene and 1-hexene, wherein
   i. the propylene copolymer (C-PP) has an overall 1-hexene content in the range of 3.8 to 10.0 wt.-%,
   ii. the propylene copolymer (C-PP) comprises:
      b-1) a first random propylene copolymer (A) of propylene and a 1-hexene having a 1-hexene content in the range of 0.1 to below 3.5 wt.-%, and
      b-2) a second random propylene copolymer (B) of propylene and 1-hexene having a higher 1-hexene content than the first random propylene copolymer (A),
   iii. the propylene copolymer (C-PP) has a xylene soluble content (XCS) in the range of 8.0 to 30.0 wt.-%, and
   iv. the weight ratio [(C-PP)/(H-PP)] of the propylene copolymer (C-PP) to the propylene homopolymer (H-PP) is in the range of 10/90 to 45/55.

2. The polypropylene composition according to claim 1, wherein the propylene copolymer (C-PP) fulfils inequation (1)

$$MFR(C\text{-}PP)/MFR(A) < 1.0 \quad (1),$$

wherein MFR(A) is the melt flow rate MFR2 (230° C., 2.16 kg) determined according to ISO 1133 (in g/10 min) of the first random propylene copolymer (A) and MFR(C-PP) is the melt flow rate MFR2 (230° C., 2.16 kg) determined according to ISO 1133 (in g/10 min) of the propylene copolymer (C-PP).

3. The polypropylene composition according to claim 1, wherein the propylene copolymer (C-PP) has a melt flow rate MFR2 (230° C., 2.16 kg) determined according to ISO 1133 in the range of 0.4 to 100.0 g/10 min.

4. The polypropylene composition according to claim 1, wherein the weight ratio between the first random propylene copolymer (A) and the second random propylene copolymer (B) within the propylene copolymer (C-PP) is in the range of 30:70 to 70:30.

5. The polypropylene composition according to claim 1, wherein the propylene copolymer (C-PP) has an amount of 2,1 erythro regio-defects in the range of 0.1 to 2.0 mol.-%.

6. The polypropylene composition according to claim 1, wherein:
   i) the first random propylene copolymer (A) has a melt flow rate MFR2 (230° C., 2.16 kg) determined according to ISO 1133 in the range of 0.3 to 12.0 g/10 min, and/or
   ii) the second random propylene copolymer (B) has a melt flow rate MFR2 (230° C., 2.16 kg) determined according to ISO 1133 in the range of 0.2 to 9.0 g/10 min.

7. The polypropylene composition according to claim 1, wherein the propylene copolymer (C-PP) fulfills in-equation (2)

$$4.5 \leq \frac{C6(C)}{C6(A) * \frac{[A]}{[C]}} \leq 9.0 \quad (2)$$

wherein
   C6(A) is the 1-hexene content of the first random propylene copolymer (A) based on the total weight of the first random propylene copolymer (A) (in wt.-%);
   C6(C) is the 1-hexene content of the propylene copolymer (C-PP) based on the total weight of the propylene copolymer (C-PP) (in wt.-%); and

[A]/[C] is the weight ratio between the first random propylene copolymer (A) and the propylene copolymer (C-PP) (in g/g).

8. The polypropylene composition according to claim 1, wherein the propylene homopolymer (H-PP) has a melt flow rate MFR2 (230° C., 2.16 kg) determined according to ISO 1133 in the range of 1.5 to 100.0 g/10 min.

9. The polypropylene composition according to claim 1, wherein the polypropylene composition has a melt flow rate MFR2 (230° C., 2.16 kg) determined according to ISO 1133 in the range of 1.5 to 100.0 g/10 min.

10. The polypropylene composition according to claim 1, wherein the polypropylene composition has a xylene soluble content (XCS) in the range of 0.5 to 12.0 wt.-%.

11. An article comprising at least 90.0 wt.-% of the polypropylene composition according to claim 1.

12. The article according to claim 11, wherein the article is a film.

13. The article according to claim 12, wherein the film has
   i) a haze before steam sterilization determined according to ASTM D 1003-00 measured on a 50 μm cast film below 10.0%, and
   ii) a haze after steam sterilization determined according to ASTM D 1003-00 measured on a 50 μm cast film below 12.0%.

14. The article according to claim 11, wherein the article is a moulded article.

15. The article according to claim 14, wherein the article is an injection moulded article.

16. A polypropylene composition comprising:
   a) a propylene homopolymer (H-PP) and
   b) a propylene copolymer (C-PP) of propylene and 1-hexene, wherein
   i. the propylene copolymer (C-PP) has an overall 1-hexene content in the range of 3.8 to 10.0 wt.-%,
   ii. the propylene copolymer (C-PP) has a xylene soluble content (XCS) in the range of 8.0 to 30.0 wt.-%,
   iii. the propylene copolymer (C-PP) has an amount of 2,1 erythro regio-defects in the range of 0.1 to 2.0 mol.-%, and
   iv. the weight ratio [(C-PP)/(H-PP)] of the propylene copolymer (C-PP) to the propylene homopolymer (H-PP) is in the range of 10/90 to 45/55.

17. An article, comprising at least 90.0 wt.-% of a polypropylene composition, the polypropylene composition comprising:
   a) a propylene homopolymer (H-PP) and
   b) a propylene copolymer (C-PP) of propylene and 1-hexene, wherein
   i. the propylene copolymer (C-PP) has an overall 1-hexene content in the range of 3.8 to 10.0 wt.-%,
   ii. the propylene copolymer (C-PP) has a xylene soluble content (XCS) in the range of 8.0 to 30.0 wt.-%, and
   iii. the weight ratio [(C-PP)/(H-PP)] of the propylene copolymer (C-PP) to the propylene homopolymer (H-PP) is in the range of 10/90 to 45/55, wherein the article is a film, and wherein the film has
   i') a haze before steam sterilization determined according to ASTM D 1003-00 measured on a 50 μm cast film below 10.0%, and
   ii') a haze after steam sterilization determined according to ASTM D 1003-00 measured on a 50 μm cast film below 12.0%.

\* \* \* \* \*